(12) United States Patent
Kim

(10) Patent No.: US 10,680,766 B2
(45) Date of Patent: Jun. 9, 2020

(54) DYNAMIC UL PRB RESOURCE ALLOCATION

(71) Applicant: Telefonaktiebolaget LM Ericsson (publ), Stockholm (SE)

(72) Inventor: Seungtai Kim, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/753,170

(22) PCT Filed: Sep. 4, 2015

(86) PCT No.: PCT/EP2015/070224
§ 371 (c)(1),
(2) Date: Feb. 15, 2018

(87) PCT Pub. No.: WO2017/036550
PCT Pub. Date: Mar. 9, 2017

(65) Prior Publication Data
US 2018/0241514 A1 Aug. 23, 2018

(51) Int. Cl.
*H04L 1/18* (2006.01)
*H04L 5/00* (2006.01)
(Continued)

(52) U.S. Cl.
CPC .......... *H04L 1/1861* (2013.01); *H04L 5/0044* (2013.01); *H04L 5/0053* (2013.01);
(Continued)

(58) Field of Classification Search
CPC ... H04L 1/1861; H04L 5/0044; H04L 5/0053; H04L 5/0055; H04L 1/1671; H04W 72/1252; H04W 72/1268
See application file for complete search history.

(56) References Cited

U.S. PATENT DOCUMENTS

| 2009/0010240 A1* | 1/2009 | Papasakellariou .... H04L 5/0007 370/344 |
| 2011/0280206 A1* | 11/2011 | Johansson ............. H04L 5/0053 370/329 |

(Continued)

OTHER PUBLICATIONS

International Search Report and Written Opinion for International Application No. PCT/EP2015/070224, dated Apr. 12, 2016, 15 pages.
(Continued)

*Primary Examiner* — Christopher M Crutchfield
*Assistant Examiner* — Tito Q Pham
(74) *Attorney, Agent, or Firm* — NDWE LLP (57) ABSTRACT

A method for dynamic allocation of radio UL Physical Resource Block pairs of a plurality of subframes in a cell of an FDMA RAN. For each of the plurality of subframes, using a bandwidth layout in frequency domain for an UL bandwidth of the cell, in which the bandwidth layout has an inner region for a PUSCH positioned between outer regions for a PUCCH. For each of the outer regions, a PUCCH layout comprises an innermost section for PUCCH Format 1 and a middle section and an outermost section are PUCCH Formats 2 and 3. Depending on the traffic load of the cell, dynamically allocating, contiguously inwards, PRB pairs to Scheduling Requests in the outer regions and contiguously extending the inner region as allowed by the dynamic allocation of PRB pairs in the outer regions in each of the plurality of subframes.

15 Claims, 4 Drawing Sheets

(51) Int. Cl.
*H04W 72/12* (2009.01)
*H04L 1/16* (2006.01)

(52) U.S. Cl.
CPC ....... *H04L 5/0055* (2013.01); *H04W 72/1252* (2013.01); *H04L 1/1671* (2013.01); *H04W 72/1268* (2013.01)

(56) References Cited

U.S. PATENT DOCUMENTS

| | | | | |
|---|---|---|---|---|
| 2012/0281566 | A1* | 11/2012 | Pelletier | H04W 76/27 370/252 |
| 2015/0163022 | A1 | 6/2015 | Johansson et al. | |
| 2015/0245343 | A1* | 8/2015 | Wang | H04L 1/1861 370/280 |
| 2015/0263022 | A1* | 9/2015 | Koyama | H01L 29/66825 257/316 |
| 2016/0150462 | A1* | 5/2016 | Yang | H04W 4/70 370/254 |
| 2017/0289936 | A1* | 10/2017 | Chae | H04L 27/26 |
| 2018/0254807 | A1* | 9/2018 | Takeda | H04B 7/0473 |

OTHER PUBLICATIONS

3GPP TS 36213, "LTE; Evolved Universal Terrestrial Radio Access (E-UTRA); Physical layer procedures," Sep. 2015, 242 pages, Version 12.6.0, Release 12, European Telecommunications Standards Institute.

3GPP TS 36.211, "3rd Generation Partnership Project; Technical Specification Group Radio Access Network; Evolved Universal Terrestrial Radio Access (E-UTRA); Physical channels and modulation, (Release 12)," Jun. 2015, 136 pages, Version 12.6.0, 3GPP Organizational Partners.

Communication under Rule 71(3) EPC for Application No. 15762541.9, dated Sep. 10, 2018, 84 pages.

Decision to Grant a European patent pursuant to Article 97(1) EPC for Application No. 15762541.9, dated Nov. 2, 2018, 2 pages.

International Preliminary Report on Patentability for Application No. PCT/EP2015/070224, dated Mar. 15, 2018, 10 pages.

* cited by examiner

DYNAMIC UL PRB RESOURCE ALLOCATION

CROSS-REFERENCE TO RELATED APPLICATIONS

This application is a National stage of International Application No. PCT/EP2015/070224, filed Sep. 4, 2015, which is hereby incorporated by reference.

TECHNICAL FIELD

The present disclosure relates to a method for dynamic allocation of radio uplink (UL) Physical Resource Block pairs (PRB pairs) of a plurality of subframes in a cell of a Frequency Division Multiple Access (FDMA) Radio Access Network (RAN).

BACKGROUND

The Long Term Evolution (LTE) Single-Carrier (SC) Frequency Division Multiple Access (FDMA), SC-FDMA, provides separate physical channels for the transmission of data and control signalling in uplink (UL), the latter being predominantly to support the downlink (DL) data transmissions. The detailed structure of these channels is designed to make efficient use of the available frequency-domain resources and to support effective multiplexing between data and control signalling.

The uplink transmission resources are defined in the frequency domain, with the smallest unit of resource being a Resource Element (RE), consisting of one SC-FDMA symbol length on one subcarrier. A Resource Block (RB) comprises 84 REs in the frequency domain for a duration of 1 slot and two RBs in same subframe (1 millisecond, ms, in time domain) form one RB pair which is often called a Physical Resource Block (PRB) pair.

There are three different physical channels in uplink, Physical Uplink Control Channel (PUCCH), Physical Random Access Channel (PRACH) and Physical Uplink Shared Channel (PUSCH). These channels share the frequency domain resources (PRB pairs) in uplink and if a certain PRB pair is used by one channel, it can not be used by other channels in a same subframe. Therefore, from an uplink capacity point of view, it is not desirable to statically allocate too many PRB pairs to PUCCH since it will reduce the number of PRB pairs which can be used by PUSCH. PRACH uses only a limited number of PRB pairs in a certain subframe, which is pre-defined by The Third Generation Partnership Project (3GPP), PUCCH and PUSCH are the channels that primarily matter when considering the uplink capacity.

A static allocation of PUCCH resource is often used, which makes it possible to manage uplink channels in a predictable manner. Also, it does not require any subsequent reconfigurations over Radio Resource Control (RRC).

There are three different formats for the PUCCH PRB pairs, i.e. format 1, format 2 and format 3, as defined in 3GPP Technical Specification (TS) 36.211 chapter 5.4. There are three different types of resources in the PUCCH format 1 PRB pairs, which are Hybrid Automatic Repeat Request (HARQ) acknowledgements (ACK) for the downlink transmissions, Scheduling Request (SR) and Channel Selection (CS). The PUCCH format 2 PRB pairs are used for Channel State Information (CSI) resources. The PUCCH format 3 PRB pairs are used for the HARQ acknowledgments for the downlink transmissions which requires multiple HARQ acknowledgments, e.g. in a 3 cell carrier aggregation case. In accordance with 3GPP there are certain rules for how to decide the position of each format. For example the position of the PUCCH format 1 PRB pairs is defined by the 3GPP so that it is on the inside of the PUCCH format 2 (CSI) PRB pairs. "Inside" here means located closer to the centre frequency of the bandwidth. PUCCH format 3 PRB pairs are then often placed on the inside of the PUCCH format 1 PRB pairs.

SUMMARY

It is an objective of the present disclosure to provide a more efficient resource utilization for reducing the number of unused PRB pairs allocated to PUCCH.

The static PUCCH resource handling is not an efficient way from a PUCCH resource utilization point of view since the PUCCH resources should be reserved for the case with the maximum traffic load. It has been observed in most types of networks that there is a big load variation over time, i.e. much more traffic in busy hours. Also, there might be unusual activities or events in a certain area whereby a more conservative PUCCH resource allocation scheme might be beneficial.

If a certain portion of the total uplink PRB pairs are statically allocated for PUCCH and these PRB pairs can never be used by PUSCH even if there is no PUCCH resources currently used in the cell. This will have an impact on the general uplink performance such as uplink peak rate and uplink capacity, and which means the spectrum efficiency is limited by static PUCCH resource handling solution.

This issue will still exist even with a simple dynamic allocation/deallocation solution, which adds/removes a PUCCH PRB pairs depending on the traffic load in the cell, since the additionally allocated PUCCH PRB pair can not be used for PUSCH until it is deallocated even if only very few PUCCH resources are actually used.

This means that an optimal spectrum efficiency in uplink can not be achieved without a dynamic uplink PRB resource allocation solution which allows for dynamic utilization of the uplink PRB resources between different uplink channels in both time and frequency domain.

So, from an uplink capacity point of view, it is beneficial to have an efficient dynamic allocation algorithm for the UL PRB resources considering different factors such as traffic load variation in the network or service types currently connected in the cell.

According to an aspect of the present disclosure, there is provided a method for dynamic allocation of radio UL PRB pairs of a plurality of subframes in a cell of an FDMA RAN. The method comprises, for each of the plurality of subframes, using a bandwidth layout in frequency domain for an UL bandwidth of the cell, which bandwidth is divided into a plurality of PRB pairs, in which bandwidth layout an inner region for PUSCH is positioned between outer regions for PUCCH. The method also comprises, for each of the outer regions, using a PUCCH layout, which PUCCH layout comprises a plurality of sections of which an innermost section is for PUCCH Format 1 and a middle section and an outermost section are for PUCCH Formats 2 and 3, wherein the innermost section comprises a plurality of parts of which an innermost part is for SRs. The method also comprises, depending on the traffic load of the cell, dynamically allocating, contiguously inwards, PRB pairs to SRs in the outer regions in the plurality of subframes in accordance with the PUCCH layout. The method also comprises contiguously extending the inner region as allowed by the dynamic allocation of PRB pairs in the outer regions in each of the plurality of subframes.

According to an aspect of the present disclosure, there is provided a use of a bandwidth layout in frequency domain for an UL bandwidth of a cell in an FDMA RAN, which bandwidth is divided into a plurality of PRB pairs, in which bandwidth layout an inner region for a PUSCH is positioned between outer regions for a PUCCH. A PUCCH layout is used for each of the outer regions, which PUCCH layout comprises a plurality of sections of which an innermost section is for PUCCH Format 1 and a middle section and an outermost section are for PUCCH Formats 2 and 3. The innermost section comprises a plurality of parts of which an innermost part is for SRs. The inner region, in some subframes, extends contiguously to comprise PRB pairs which in other subframes are comprised in the outer regions.

According to another aspect of the present disclosure, there is provided a RAN node for an FDMA RAN. The RAN node comprises processor circuitry, and storage storing instructions executable by said processor circuitry whereby said RAN node is operative to, for each of a plurality of subframes, use a bandwidth layout in frequency domain for an UL bandwidth of a cell provided by the RAN node, which bandwidth is divided into a plurality of PRB pairs, in which bandwidth layout an inner region for a PUSCH is positioned between outer regions a PUCCH. The RAN node is also operative to, for each of the outer regions, use a PUCCH layout, which PUCCH layout comprises a plurality of sections of which an innermost section is for PUCCH Format 1 and a middle section and an outermost section are for PUCCH Formats 2 and 3, wherein the innermost section comprises a plurality of parts of which an innermost part is for SRs. The RAN node is also operative to, depending on the traffic load of the cell, dynamically allocate, contiguously inwards, PRB pairs to SRs in the outer regions in the plurality of subframes in accordance with the PUCCH layout. The RAN node is also operative to contiguously extend the inner region as allowed by the dynamic allocation of PRB pairs in the outer regions in each of the plurality of subframes.

According to another aspect of the present disclosure, there is provided a computer program product comprising computer-executable components for causing a RAN node to perform an embodiment of the method of the present disclosure when the computer-executable components are run on processor circuitry comprised in the RAN node.

According to another aspect of the present disclosure, there is provided a computer program for dynamic allocation of radio UL PRB pairs of a plurality of subframes in a cell of an FDMA RAN. The computer program comprises computer program code which is able to, when run on processor circuitry of a RAN node, cause the RAN node to, for each of the plurality of subframes, use a bandwidth layout in frequency domain for an UL bandwidth of the cell, which bandwidth is divided into a plurality of PRB pairs, in which bandwidth layout an inner region for a PUSCH is positioned between outer regions for a PUCCH. The code is also able to cause the RAN node to, for each of the outer regions, use a PUCCH layout, which PUCCH layout comprises a plurality of sections of which an innermost section is for PUCCH Format 1 and a middle section and an outermost section are for PUCCH Formats 2 and 3, wherein the innermost section comprises a plurality of parts of which an innermost part is for SRs. The code is also able to cause the RAN node to, depending on the traffic load of the cell, dynamically allocate, contiguously inwards, PRB pairs to SRs in the outer regions in the plurality of subframes in accordance with the PUCCH layout. The code is also able to cause the RAN node to contiguously extend the inner region as allowed by the dynamic allocation of PRB pairs in the outer regions in each of the plurality of subframes.

According to another aspect of the present disclosure, there is provided a computer program product comprising an embodiment of the computer program of the present disclosure and a computer readable means on which the computer program is stored.

By using a dynamic uplink PRB resource allocation which allows for dynamic allocation of the uplink PRB resources between different uplink channels, more uplink PRB pairs can be assigned for data/signalling transmissions on PUSCH, which results in a higher UL peak rate and UL capacity in the network.

In other words, the uplink PRB resources can be flexibly and dynamically utilized by both PUCCH and PUSCH, which makes it possible to utilize a larger part of the UL bandwidth for data transmissions and allows for achieving increased spectrum efficiency on uplink.

Another advantage is that it may be made possible to perform a SON (Self Organized Network) type of operation so that the network may automatically manage big variations on the traffic load at for instance sports events without extra reconfiguration efforts.

Also, a more efficient utilization of the RAN node capacity may be achieved by pooling the maximum number of manageable PUCCH PRB pairs per base station between cells, which makes it possible to accommodate more cells in the base station and hence increase the base station capacity.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown.

However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
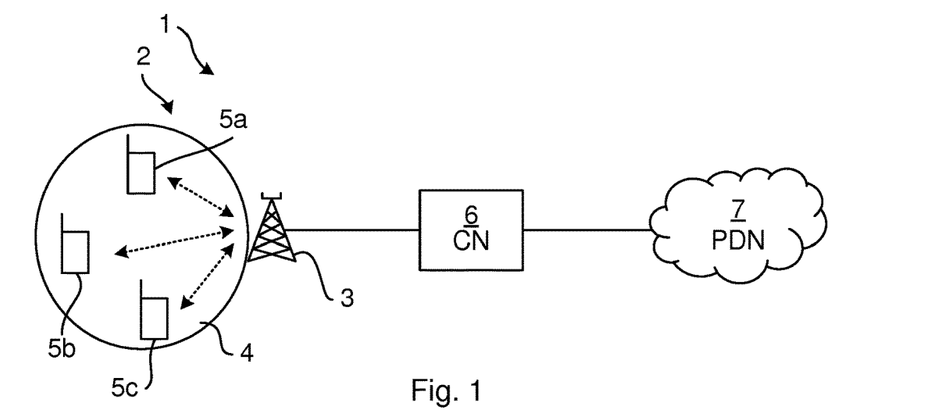
FIG. 1 is a schematic block diagram of an embodiment of a radio communication system in accordance with the present disclosure.

FIG. 1 illustrates an embodiment of a communication network 1 comprising a Radio Access Network (RAN) 2 connected to a Packet Data Network (PDN) 7, e.g. the Internet, via a Core Network (CN) 6. The RAN 2 comprises at least one, typically a plurality of, RAN node 3, e.g. a base station such as a Node B of a Universal Mobile Telecommunications System (UMTS) communication network or an evolved Node B (eNB) of an LTE communication network. The RAN node 3 provides at least one cell 4 of the RAN, to which cell one or a plurality of radio devices 5 is connected, e.g. for access to the PDN 7. In the figure, three radio devices 5a, 5b and 5c are shown as an example. The double-headed dashed arrows indicates UL and DL FDMA radio communication between the RAN node 3 and respective radio device 5.

The radio device 5 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 2:
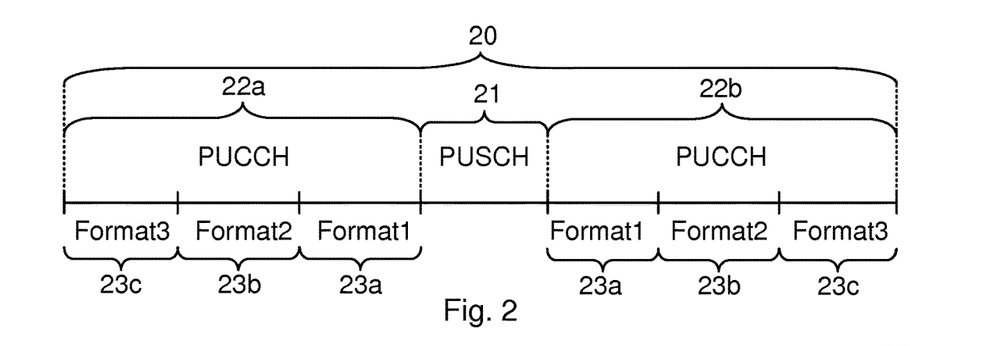
FIG. 2 is a schematic diagram of an embodiment of a bandwidth layout in accordance with the present disclosure.

FIG. 2 illustrates a bandwidth layout in the frequency domain, wherein the bandwidth 20 for UL SC-FDMA transmissions in the cell 4, between the radio devices 5 connected to the cell and the RAN node 3 providing said cell, is divided into an inner region 21 for comprising PRB pairs allocated to the PUSCH and outer regions 22 for comprising PRB pairs allocated to the PUCCH. The inner region 21 is in each subframe flanked by two outer regions 22a and 22b, one on each side of the inner region, in the frequency domain. However, in accordance with the present disclosure, the number of PRBs comprised in the inner and outer regions, respectively, varies dynamically in the time domain (i.e. in different subframes). Preferably, in some subframes, the outer regions 22 may not comprise any PRB at all (i.e. all PRBs of those subframes are comprised in the inner region 21). The two outer regions 22a and 22b are typically symmetrical, implying that in each subframe the first outer region 22a comprises the same number of PRB(s), possibly none, as the second outer region 22b. The bandwidth may for example be 20 MHz, corresponding to 100 PRB pairs.

Each outer region 22 is divided into one or a plurality of sections 23. Typically, the outer region is divided into three sections 23a, 23b and 23c, e.g. corresponding to the three formats Format 1, Format 2 and Format 3 mentioned above. In the embodiment of FIG. 2, Format 1 is in the innermost section 23a, adjacent to the inner region 21 and to Format 2 in the middle section 23b which in its turn is adjacent with Format 3 in the outermost section 23c.

By allocating the uplink PRB resources between different uplink channels (PUCCH and PUSCH) in both time and frequency domain, more uplink PRBs 30 can be allocated for the data transmission on PUSCH which will provide improved spectrum efficiency, higher peak rate and higher capacity on uplink.

Figure 3:
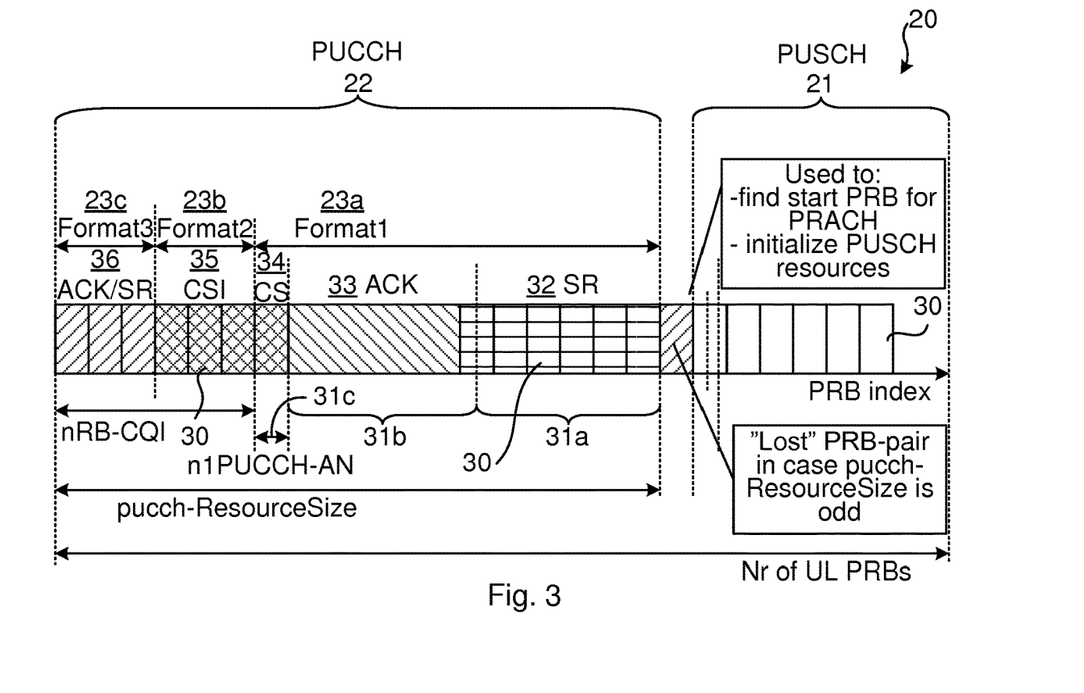
FIG. 3 is a schematic diagram of an embodiment of a PUCCH layout in accordance with the present disclosure.

FIG. 3 illustrates an embodiment of a PUCCH layout of an outer region 22, e.g. the outer region 22a as shown in FIG. 2. The Formats 1-3 of sections 23 are as discussed in relation to FIG. 2. It is noted that the outer region 22 may comprise a waisted PRB pair 30, in an innermost position, adjacent the inner region 21, which is not allocated to Format 1, if the PUCCH resource size is odd in terms of number of PRB pairs.

The inner section 23a for Format 1 is divided into a plurality of parts 31 for different types of resources. An innermost part 31a, adjacent to the inner region 21, or the lost PRB pair (if present), is for comprising PRB pairs 30 allocated to SR 32. A middle part 31b, adjacent the innermost part 31a, may be for comprising PBR pairs 30 allocated to HARQ-ACK 33, while an outermost part 31c, adjacent the middle part 31b, may be for comprising PBR pair(s) 30 allocated for CS 34.

The middle section 23b for Format 2 may be for comprising PBR pairs 30 allocated for CSI 35, and the outer section 23c for Format 3 may be for comprising PBR pairs 30 allocated to HARQ acknowledgements 36 for Carrier Aggregation (CS) users (i.e. radio devices) requiring multiple HARQ acknowledgements. In other embodiments, the middle section 23b may be for Format 3 and the outermost section 23c may be for Format 2.

In the outer region 22 for PUCCH, the PUCCH format 3 PRB pairs 30 of the section are placed in the most outside of the bandwidth 20 and the PUCCH format 2 (CSI 35) PRB pairs are placed right inside them. This is because the 3GPP allows having a mixed format between Format 1 and Format 2, which may not be possible if the PUCCH Format 3 PRB pairs 30 are placed next to the PUCCH format 1 PRB pairs.

The PUCCH Format 1 PRB pairs are placed right inside the PUCCH Format 2 (CSI) PRB pairs as defined by the 3GPP. However there is no restriction on the position of SR 32, CS 34 and HARQ-ACK 33 resources within the PUCCH Format 1 PRB pairs. The SR resources can thus be placed in the most inside of the outer region 22 of the bandwidth 20, which is next to the inner (PUSCH) region 21, to have a more efficient dynamic uplink PRB resource allocation on PUCCH since the number of PUCCH Format 1 PRB pairs may vary depending on the number of allocated SR resources.

The CS 34 and HARQ-ACK 33 PBR resources are placed between the PUCCH Format 2 (CSI 35) PRB pairs and the SR PRB resources. This means that these Format 1 resources are statically configured in the cell 4 and the configuration will not be dynamically changed. Therefore, at cell setup, the number of HARQ-ACK 33 resources should be reserved so that it is enough for the case where the control region for the PDCCH is fully utilized, e.g. 88 HARQ-ACK PRB pairs 30 with 20 MHz bandwidth. This may be realized by starting the SR 32 resource allocation from the Format 1 PRB resources directly from the inside of the allocated HARQ-ACK 33 PRB resources. Similarly, the CS 34 PRB resources and the HARQ-ACK 33 PRB resources may be allocated from the format 1 PRB resources such that the HARQ-ACK 33 PRB resources are allocated directly from the inside of the allocated CS PRB resources. However, the actual number of HARQ-ACK and CS PRB pairs 30 used in each subframe will vary depending on the downlink scheduling and this means further gain in the dynamic uplink PRB resource allocation can be achieved by properly coordinating the downlink scheduling as further described below.

Figure 4:
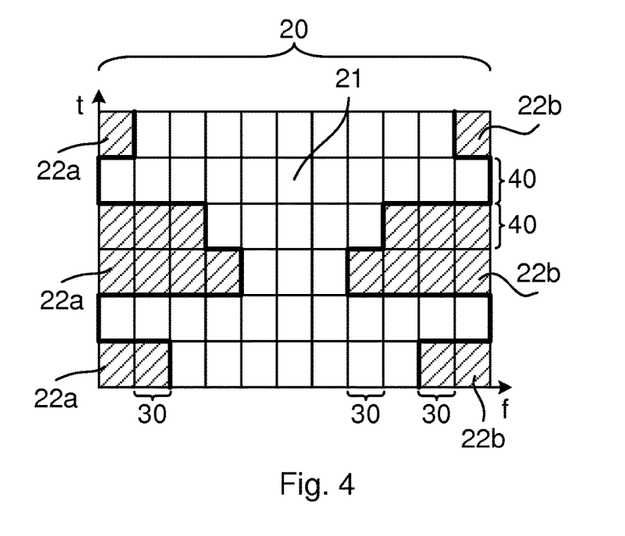
FIG. 4 is a schematic diagram illustrating inner and outer regions of the bandwidth in accordance with the present disclosure.

FIG. 4 schematically illustrates an embodiment of an UL bandwidth 20 of the cell 4. The bandwidth extends in the frequency domain over a plurality of PRB pairs 30 (only some are indicated with reference numerals in the FIG.), and in the time direction over a plurality of subframes 40 (only some are indicated with reference numerals in the FIG.). The inner region 21 for PUSCH extends over a varying number of PRB pairs in the different subframes, as allowed by the flanking outer regions 22a and 22b for PUCCH which extends over the remaining PRB pairs (marked by diagonal lines). A bold line illustrates the boarder between the inner region and the outer regions. As can be seen, the outer regions may in some subframes include no PRB pairs at all, allowing all of the PRB pairs of those subframes to be included in the inner region and allocated to PUSCH, while in other subframes varying number of PRB pairs are included in the outer regions.

Figure 5:
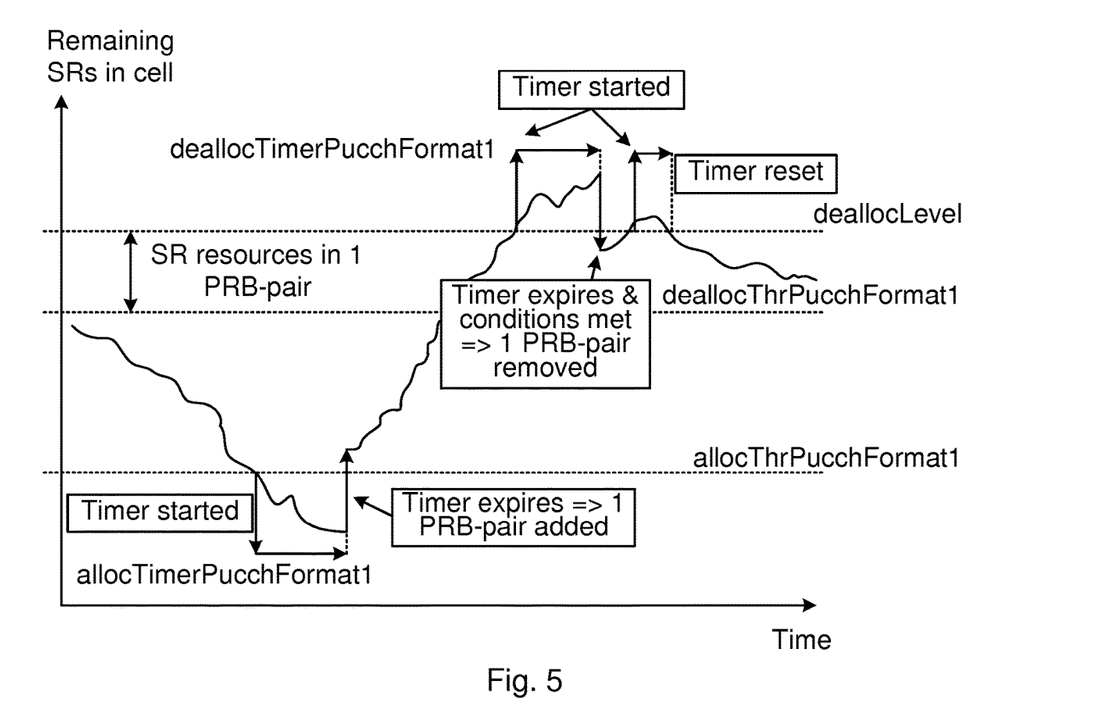
FIG. 5 is a schematic diagram of an example embodiment of allocation and deallocation of PUCCH Format 1 PRB pairs in accordance with the present disclosure.

FIG. 5 shows the dynamic allocation and deallocation operation of the PUCCH Format 1 PRB pairs 30 in view of the number of users in a cell 4 (i.e. number of radio devices 5 connected to the cell 4) in accordance with an example embodiment of the present disclosure. The allocation and deallocation of the PUCCH Format 1 PRB pairs may be performed based on the traffic load, e.g. allocating an additional PUCCH Format 1 PRB pair when traffic grows. The usage of the SR 32 resources per cell 4 is used as a measure for the traffic load since one SR resource is allocated to each radio device 5 in connected mode. Each radio device 5 connected to the cell 4 is allocated to one SR resource, and one PUCCH Format 1 PRB pair 30 can contain multiple SR resources per subframe 40 as defined in 3GPP Technical Specification (TS) 36.211 chapter 5.4.

When there is a request for SR resource, the number of the available remaining SR resources may be calculated in all PUCCH Format 1 PRB pairs, and if it is less than a pre-defined level which is configured by the parameter allocThrPucchFormat1, a timer configured by the parameter allocTimerPucchFormat1 will start. If the timer expires, the PUCCH manager may allocate an additional PUCCH Format 1 PRB pair. The timer may be reset when the number of the available remaining SR resources in all PUCCH Format 1 PRB pairs is equal to or more than the pre-defined level which is configured by the parameter allocThrPucchFormat1.

When there is a release of SR resource (typically because one or more radio devices has disconnected from the cell), the number of the available remaining SR resources will be calculated in all PUCCH Format 1 PRB pairs and if it is more than the pre-defined level "deallocLevel" which is decided by the parameter deallocThrPucchFormat1 as described below, a timer may be started which is configured by the parameter deallocTimerPucchFormat1. The reason why the formula of deallocLevel includes the number of SR resources in 1 PUCCH Format 1 PRB pair is that the parameter deallocThrPucchFormat1 is for the number of available remaining SR resources after the deallocation of 1 PUCCH format 1 PRB pair.

deallocLevel=deallocThrPucchFormat1+number of SR resources in one PUCCH Format 1 PRB pair The innermost PUCCH Format 1 PRB pair which is placed next to the inner PUSCH region 21 may be deallocated, so that the PRB pair may instead be comprised in the inner region and used for PUSCH if the following conditions are met:

the timer which is configured by the parameter deallocTimerPucchFormat1 is expired, there is no SR resource allocated in the innermost PUCCH Format 1 PRB pair which will be deallocated, the total number of currently allocated PUCCH PRB pairs (including Format 1, 2 and 3) is an odd number or the number of PUCCH Format 1 PRB pairs used for SR resources is more than two.

The second condition above is to avoid the situation where an existing connected user loses its SR resource just because it belongs to the deallocated PUCCH Format 1 PRB pair. By the third condition above, the deallocation will not occur if the total number of currently allocated PUCCH PRB pairs (including Format 1, 2 and 3) is not an odd number since the deallocated PRB pairs can in that case not be used by PUSCH anyway according to the 3GPP standard. However, the deallocation is allowed when the number of PUCCH Format 1 PRB pairs used for SR resources is more than two even if the total number of currently allocated PUCCH PRB pairs (including Format 1, 2 and 3) is an even number, since another PUCCH Format 1 PRB pair may be deallocated again in the future.

The timer which is configured by the parameter deallocTimerPucchFormat1 may be reset when the number of the available remaining SR resources in all PUCCH Format 1 PRB pairs is equal to or less than the pre-defined level "deallocLevel" which is decided by the parameter deallocThrPucchFormat1.

Figure 6A:
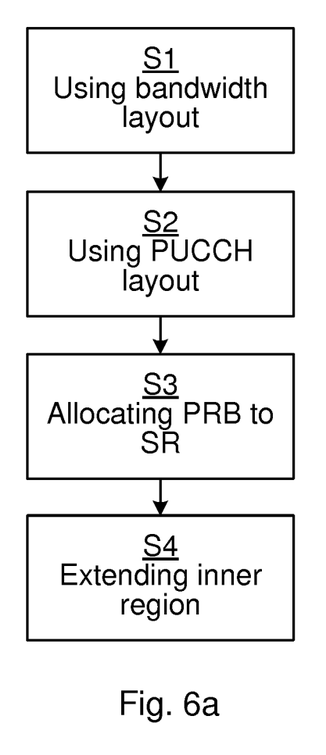
FIG. 6a is a schematic flow chart of an embodiment of a method of the present disclosure.

FIG. 6a is a schematic flow chart of an embodiment of the method of the present disclosure. The method is for dynamic allocation of radio UL PRB pairs 30 of a plurality of subframes 40 in a cell 4 of an FDMA RAN 2. The method may be performed by a RAN node 3.

For each of the plurality of subframes, a bandwidth layout in frequency domain for an UL bandwidth 20 of the cell 4 is used S1. The bandwidth is divided into a plurality of PRB pairs. In the bandwidth layout, an inner region 21 for a PUSCH is positioned between outer regions 22a and 22b for a PUCCH. This implies that for each subframe 40 there is an inner region 21 flanked by outer regions 22a and 22b. However, as discussed herein, the number of PRB pairs comprised in the outer and inner regions, respectively, may vary between different subframes depending on the dynamic allocation of the present disclosure. In some subframes, the outer regions may comprise zero PRB pairs.

For each of the outer regions 22a and 22b, a PUCCH layout is used S2. The PUCCH layout comprises (or is divided into) a plurality of sections 23a, 23b and 23c of which an innermost section 23a is for PUCCH Format 1 and a middle section 23b and an outermost section 23c are for PUCCH Formats 2 and 3, wherein the innermost section 23a comprises (or is divided into) a plurality of parts 31a, 31b and 31c of which an innermost part 31a is for SRs 32. Again, it should be noted that the sections 23 and parts 31 are only part of the PUCCH layout and may or may not actually contain any allocated PUCCH PRB pairs 30 in the different subframes, depending on the dynamic PRB allocation of the present disclosure.

Depending on the traffic load of the cell 4, PRB pairs 30 are dynamically allocated S3, contiguously inwards, to SRs 32 in the outer regions 22 in the plurality of subframes 40 in accordance with the PUCCH layout. Thus, different subframes of the plurality of subframes may contain different number (including zero) of PRB pairs allocated to SR.

The inner region 21 is contiguously extended S4 as allowed by the dynamic allocation of PRB pairs in the outer regions 22 in each of the plurality of subframes. Thus, if there are unused/unallocated PRB pairs adjacent to a PRB pair allocated to PUSCH, the inner region can extend to comprise also these PRB pairs and they can be allocated to PUSCH.

Figure 6B:
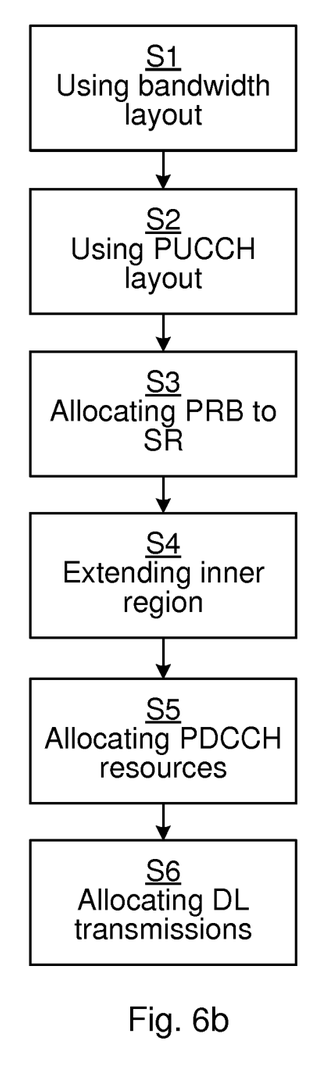
FIG. 6b is a schematic flow chart of another embodiment of a method of the present disclosure.

FIG. 6b is a schematic flow chart of another embodiment of the method of the present disclosure. According to this embodiment, in addition to the steps disclosed in relation to FIG. 6a, further steps are disclosed.

In some embodiments of the present disclosure the step of dynamically allocating S3 PRB pairs 30 to SRs 32 comprises dynamic allocation in the time domain by only allocating PRB pairs to SRs in each subframe of a subgroup of the plurality of subframes 40. The method may then also comprise dynamically allocating S5 resources of a Physical Downlink Control Channel (PDCCH) such that corresponding HARQ ACKs 33 in the middle part 31b are allocated PRB pairs 30 in the frequency domain as outwardly as possible primarily in subframes 40 which are not part of the subgroup of the plurality of subframes 40. Thereby, the inner region 21 may be allowed to, in the other subframes not part of the subgroup, extend to include PRB pairs which are, in the subframes of the subgroup, allocated to HARQ ACKs 33, since there are no SR allocated PRB pairs in those other subframes.

Depending on the traffic load of the cell 4, DL transmissions may be dynamically allocated S6 in the time domain such that corresponding acknowledgement recourses (such as ACK 33, CS 34 and/or Format 3 ACK 36) of Format 1 and/or Format 3 are allocated PRB pairs 30 primarily in subframes 40 part of the subgroup of the plurality of subframes. This may additionally free up PRB pairs 30 which the inner region 21 may be allowed to contiguously extend over in the subframes not part of the subgroup. DL transmissions on both PDCCH and Physical Downlink Shared Chanel (PDSCH) may advantageously be dynamically allocated since PDSCH is transmitted always together with PDCCH in a certain subframe.

As discussed in relation to FIG. 5, in some embodiments of the present disclosure, the step of dynamically allocating S3 PRB pairs 30 to SRs 32 comprises allocating an additional PRB pair 30 to SRs 32 if the number of available (i.e. unused) SR resources allocated PRB pairs is below a predetermined first threshold, and/or deallocating an innermost SR allocated PRB pair if the number of available SR resources allocated PRB pairs is above a predetermined second threshold. The allocating of an additional PRB pair 30 may be triggered by the expiry of a first timer, and/or wherein the deallocating of a PRB pair is triggered by the expiry of a second timer.

According to an aspect of the present disclosure, there is provided a use of a bandwidth layout in frequency domain for an UL bandwidth 20 of a cell 4 in an FDMA RAN 2, which bandwidth is divided into a plurality of PRB pairs 30, in which bandwidth layout an inner region 21 for a PUSCH is positioned between outer regions 22a and 22b for a PUCCH. A PUCCH layout is used for each of the outer regions, which PUCCH layout comprises a plurality of sections of which an innermost section 23a is for PUCCH Format 1 and a middle section 23b and an outermost section 23c are for PUCCH Formats 2 and 3. The innermost section comprises a plurality of parts of which an innermost part 31a is for SRs. The inner region, in some subframes 40, extends contiguously to comprise PRB pairs which in other subframes are comprised in the outer regions.

The dynamic uplink PRB resource allocation of the present disclosure may comprise any of up to five parts.

The first part is to introduce the specific PUCCH layout in accordance with FIG. 3 which secures the dynamic allocation and deallocation operation of the PUCCH Format 1 PRB pairs 30 that is used for SR resources.

The second part is the dynamic allocation and deallocation operation of the PUCCH Format 1 PRB pairs depending on the traffic load in the cell as discussed in the example of FIG. 5. This makes it possible to allocate only the minimum number of PUCCH Format 1 PRB pairs for PUCCH and allows the uplink scheduler to allocate the remaining PRB pairs for PUSCH. This is a dynamic operation performed in the frequency domain.

The third part is dynamic allocation and deallocation of the PUCCH resources such as SR 32 and CSI 35 in the time domain depending on the traffic load in the cell. This makes it possible to allocate the PUCCH resources only in the minimum number of subframes and allows the uplink scheduler to allocate the unused PRB pairs for PUSCH in the subframes with less PUCCH resources allocated. This is a dynamic operation performed in the time domain.

The fourth part is dynamic allocation of the PDCCH resources, i.e. Control Channel Elements (CCEs), in the frequency domain. This makes it possible to use the HARQ-ACK 33 resources only in preferred positions (outermost in the middle part 31b) and allows the uplink scheduler to allocate the unused PRB pairs for PUSCH. This is a dynamic operation performed in the frequency domain which may have synergy with the third part.

The fifth part is dynamic downlink scheduling in the time domain depending on the traffic load in the cell. This makes it possible to allocate the PUCCH resources such as Format 3 of the outer section 23c, CS 34 and HARQ-ACK 33 only (or mainly) in the subframes 40 in which other PUCCH resources such as SR 32 and CSI 35 are allocated, and allows the uplink scheduler to utilize the unused PUCCH PRB pairs 30 for PUSCH in the subframes 40 where no PUCCH resources are used. This is a dynamic operation performed in time domain.

The first part mentioned above is to introduce a specific PUCCH layout which makes it possible to have dynamic uplink PRB resource allocation. This layout has already been presented in FIG. 3 and the discussion thereof.

The second part is the dynamic allocation and deallocation operation of the PUCCH Format 1 PRB pair depending on the traffic load in the cell, which makes it possible to allocate only the minimum number of PUCCH Format 1 PRB pairs 30 that is used for SR 32 resources. The dynamic PUCCH operation is achieved by the dynamic allocation and deallocation of the PUCCH Format 1 PRB pairs which are used only for SR resources. This means that all other PUCCH resources, including PUCCH Format 2 and 3 PRB pairs, may be statically configured and the number of PRB pairs for these formats may not be dynamically changed.

This is because otherwise the dynamic change of these formats may cause massive number of RRC reconfigurations for all users in the cell who occupy any of the PUCCH resources. An example of the second part has already been disclosed in FIG. 5 and the discussion thereof.

The third part of the proposed solution is the dynamic allocation and deallocation operation of the PUCCH resources such as SR and CSI in the time domain depending on the traffic load in the cell. This makes it possible to allocate the PUCCH resources only in the minimum set of subframes and allows the uplink scheduler to allocate the unused PUCCH PRB pairs for PUSCH. This is a dynamic operation performed in the time domain.

The SR resource is allocated with a certain periodicity, which is configured by the RRC configuration, and this means different connected users can share the same SR resource as long as the time offsets, i.e. subframes, of the allocated SR resources are different. For example 10 connected users can share the same SR resource if the periodicity of SR is 10 ms. After all time offsets for a certain SR resource are occupied, the next SR resource will start being allocated. This means the SR allocation is done first in the time offset domain and then in the SR resource domain.

The same goes for CSI which also has its own periodicity and same PUCCH format 2 resources can be shared by many connected users. Also the CSI allocation is done first in the time offset domain and then in the CSI resource domain.

In the third part, the SR 32 allocation starts from the SR resource which has the lowest resource index and is performed with time offset X (i.e. subframe 40 number X) that fulfil the following formula. The time offset allocation is done in an ascending order.

$$0 = X \bmod (pucchAllocOffset)$$

The pucchAllocOffset is the parameter which decides the interval between the time offsets for the SR 32 and CSI 35 allocation.

If all time offset X for a certain SR resource are occupied, the next SR resource will start being allocated and the time offset X in that SR resource will be allocated in an ascending order. This will continue until all time offset X in all SR resources are occupied. If all time offset X in all SR resources are occupied, the SR allocation will be performed in the time offset X+1 in the SR resource which has the lowest resource index and then will continue to be performed in the same way as for the time offset X. This means, for example in a low load situation, that the SR 32 is allocated only in the time offset X, i.e. SR is not allocated in any other time offsets which is why the corresponding PRBs 30 in the subframes 40 corresponding to those other time offsets will be unused and may instead be allocated for PUSCH.

The same goes for CSI and the CSI allocation starts from the CSI resource which has the lowest resource (i.e. cycle shift) index and is performed with time offset X (i.e. subframe 40 number X). And the time offset allocation is done in an ascending order. If all time offset X for a certain CSI resource are occupied, the next CSI resource will start being allocated and the time offset X in that CSI resource will be allocated in an ascending order. This will continue until all time offset X in all CSI resources are occupied. If all time offset X in all CSI resources are occupied, the CSI allocation will be performed in the time offset X+1 in the CSI resource which has the lowest resource index and then will continue to be performed in the same way as for the time offset X. This means, for example in a low load situation, that the CSI 35 of Format 2 in the middle section 23b is allocated only in the time offset X, i.e. CSI is not allocated in any other time offsets.

SR resources and CSI resources are defined in 3GPP TS 36.211 chapter 5.4.

With this time domain PUCCH resource allocation solution, SR 32 and CSI 35 resources may be allocated only in the minimum set of the time offsets which makes it possible for the uplink scheduler of the RAN node 3 to allocate the PUCCH PRB pairs 30 for PUSCH use instead (i.e. for data transmissions) in the time offsets (subframes 40) where the SR and CSI resources are not allocated. This is especially beneficial in a low or medium load situation where the uplink peak rate and uplink capacity can be maximized by utilizing the non-allocated PUCCH PRB pairs for PUSCH.

The fourth part of the proposed solution is the dynamic allocation operation of the PDCCH resources, i.e. CCEs, in the frequency domain. This makes it possible to allocate the HARQ-ACK 33 resources only in the preferred position and allows the uplink scheduler to allocate the unused PRB pairs 30 for PUSCH.

The HARQ-ACK resources are allocated in the PUCCH Format 1 PRB pairs, which is placed between the CS 34 and SR 32 resources. The HARQ-ACK resource index is one to one mapped to the first CCE index which is used in the PDCCH assignment for the downlink transmission. This means that if the first CCE index for the PDCCH assignment for the downlink transmission has a low value, the HARQ-ACK resource index will also be low and the HARQ-ACK resource will be placed in the outermost side (left side in FIG. 3) of the PUCCH Format 1 PRB pairs.

This may be beneficial if there are no SR 32 resources allocated (or expected to be used) in the same subframe 40 since the uplink scheduler can allocate all the unused PUCCH Format 1 PRB pairs, which are otherwise used for SR 32 and HARQ-ACK 33, for PUSCH in that subframe. The SR resources are sometimes expected to not be used in certain subframes. For example, the SR may not be used during a certain period for Voice over IP (VoIP) type of services since it is not good for the battery saving if SR is sent every time there is an uplink voice packet arrived in the uplink buffer. Also there is a case where the RAN node 3 (e.g. eNB) can send an uplink scheduling grant in advance in order to reduce the latency, and in this case SR is not expected to be used for a certain period.

In the fourth part, the low CCE indexes may be allocated as much as possible for the PDCCH assignment for the downlink transmissions. This includes also the DL transmissions which use common search space on PDCCH. However, the high CCE indexes may be allocated as much as possible for the PDCCH assignment for the uplink transmissions. This is because it makes it easier for the downlink transmissions to get allocated in the low CCE indexes since the CCE indexes can be allocated to the uplink transmissions before the downlink transmissions.

This means that the PDCCH resource allocation will be done in such a way that the downlink scheduled scheduling entities will be assigned from the left (low) side of CCE indexes in their radio device specific search space. On the other hand, the uplink scheduled scheduling entities will be assigned from the right (high) side of CCE indexes in their radio device specific search space.

This will make the required HARQ-ACK 33 resources exist mostly in low index area in the PUCCH Format 1 resources (outermost in the middle part 31b of the inner section 23a) and the rest of HARQ-ACK resources are not used, i.e. the uplink scheduler can use them as PUSCH resources. This is a dynamic uplink PRB resource allocation operation performed in the frequency domain and the gain of this dynamic operation can be further increased in conjunction with the third part discussed above which may create a number of subframes 40 where the SR 32 resources are not allocated at all, allowing the inner region 21 to extend contiguously past the unused SR PRB resources to also comprise the unused ACK 33 PRB resources. This solution may also provide some advantage even in the subframes where the SR resources are allocated but are not expected to be used, as described above.

CSICSI

The fifth part of the proposed solution is the dynamic scheduling operation in the time domain depending on the traffic load in the cell 4. This part of the solution may increase the probability of achieving the maximum gain of the dynamic uplink PRB resource allocation solution since the HARQ acknowledgement 33, 34 and 36 resources are not controlled in the time domain by the previous four parts of the solution.

There are three different HARQ-ACK resources which are used for the HARQ acknowledgement for the downlink transmissions. The HARQ-ACK 33 resource is used for the non-CA(Carrier Aggregation) users and CS 34 is for the CA users that need more than two HARQ acknowledgements. And PUCCH Format 3 resources 36 are used for the CA users who need multiple HARQ acknowledgements, e.g. the three cell carrier aggregation users.

As described earlier, the CS 34 and HARQ-ACK 33 resources are placed between the PUCCH Format 2 (CSI 35) PRB pairs 30 and the SR 32 resources, but the PUCCH Format 3 PRB pairs are located outermost in the bandwidth 20. This means that the unused PUCCH resources in some subframes 40, e.g. SR 32 and CSI 35, can not be fully utilized by the uplink scheduler if they are fragmented by these HARQ acknowledgement resources. In order to minimize this fragmentation problem, the HARQ acknowledgements need to be coordinated in the downlink scheduler in such a way that they are transmitted only (or mainly) in the subframes 40 where other PUCCH resources such as SR 32 and CSI 35 are used. In this case the uplink scheduler can fully utilize all the unused PUCCH PRB pairs 30, even up to all uplink PRB pairs in the whole bandwidth 20, in the subframes 40 where no PUCCH resources are allocated or expected to be transmitted.

In the fifth part, all downlink subframes may be categorized into two groups, uplink preferred subframes and other subframes. The uplink preferred subframes are the downlink subframes where the scheduling of the downlink transmission is not preferred since the HARQ acknowledgements for the downlink transmissions in these subframes will occur in the subframes where no PUCCH resources are allocated or expected to be transmitted. In other words, the maximum number of PRB pairs 30 may be used for the uplink scheduling by avoiding scheduling the downlink scheduling radio devices in the uplink preferred subframes.

The uplink preferred subframes are the ones that are four subframes before the uplink subframes 40 such as:
uplink subframes where the PUCCH resources (e.g. SR 32 and CSI 35) are allocated in the time domain as described in the third part discussed above,
uplink subframes where no PUCCH resources are expected to be transmitted even if PUCCH resources are allocated, e.g. since it is Voice over Internet Protocol (VoIP) type of services, as described regarding the fourth part discussed above,
uplink subframes where no PUCCH resources are expected to be transmitted even if PUCCH resources are allocated since the base station 3 has sent an uplink scheduling grant,
uplink subframes where no PUCCH resources are expected to be transmitted even if PUCCH resources are allocated since the user 5 is in sleep mode outside the Discontinuous Reception (DRX) window.

In the uplink preferred subframes, the scheduler 74 may not schedule any radio device 5 in downlink if the following conditions are met:
there is at least one uplink scheduling radio device 5 in this uplink preferred subframe which has enough data in the buffer to utilize all uplink PRB pairs 30 in the whole bandwidth 20,
all downlink scheduling radio devices 5 in this uplink preferred subframe can be scheduled in the next subframe which is not an uplink preferred subframe, e.g. none of the downlink scheduling candidates will be outside the DRX window in the next subframe,
the total amount of data of all downlink scheduling radio devices can be transmitted in the next subframe which is not an uplink preferred subframe,
there is no signalling radio bearer among the downlink scheduling radio devices in this uplink preferred subframe.

The conditions above may make sure that the restrictions on the downlink scheduling in the uplink preferred subframes will not give a negative impact on the general scheduling policy and will allow the uplink scheduler to utilize all the unused PRB pairs 30 in the uplink subframes 40 which come four subframes after the uplink preferred subframes. This is a dynamic operation performed in time domain, which interacts with both uplink and downlink scheduler.

Figure 7A:
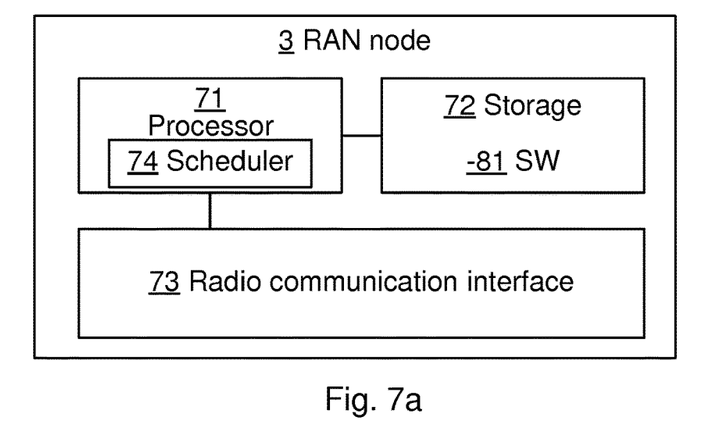
FIG. 7a is a schematic block diagram of an embodiment of a RAN node of the present disclosure.

FIG. 7a illustrates an embodiment of a RAN node 3 of the present disclosure, e.g. a base station such as an eNB. The RAN node 3 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 81 (see also FIG. 8) stored in a storage 72 of one or several storage unit(s) e.g. a memory. The SW 81 may e.g. comprise computer program(s) for running a scheduler 74 e.g. formed in the processor circuitry 71. The scheduler 74 may e.g. comprise a PUCCH manager for allocation of PRB pairs 30 to the PUCCH as well as an UL scheduler for allocation of UL PRB pairs to the PUSCH in the UL bandwidth 20 and a DL scheduler for allocating DL PRB pairs in a DL bandwidth. The storage unit is regarded as a computer readable means 82 (see FIG. 8) as discussed herein and may e.g. be in the form of a Random Access Memory (RAM), a Flash memory or other solid state memory, or a hard disk, or be a combination thereof. The processor circuitry 71 may also be configured to store data in the storage 72, as needed. The RAN node 3 also comprises a radio communication interface 73 for radio communication with the radio devices 5 by means of the UL bandwidth 20 as well as a DL bandwidth.

According to an aspect of the present disclosure, there is provided a RAN node 3 for an FDMA RAN 2. The RAN node comprises processor circuitry 71, and storage 72 storing instructions 81 executable by said processor circuitry whereby said RAN node is operative to, for each of a plurality of subframes, use a bandwidth layout in frequency domain for an UL bandwidth 20 of a cell 4 provided by the RAN node, which bandwidth is divided into a plurality of PRB pairs, in which bandwidth layout an inner region 21 for a PUSCH is positioned between outer regions 22a and 22b for a PUCCH. The RAN node 3 is also operative to, for each of the outer regions 22a and 22b, use a PUCCH layout, which PUCCH layout comprises a plurality of sections 23a, 23b and 23c of which an innermost section 23a is for PUCCH Format 1 and a middle section 23b and an outermost section 23c are for PUCCH Formats 2 and 3, wherein the innermost section 23a comprises a plurality of parts 31a, 31b and 31c of which an innermost part 31a is for SRs 32. The RAN node is also operative to, depending on the traffic load of the cell 4, dynamically allocate, contiguously inwards, PRB pairs 30 to SRs 32 in the outer regions 22 in the plurality of subframes 40 in accordance with the PUCCH layout. The RAN node is also operative to contiguously extend the inner region 21 as allowed by the dynamic allocation of PRB pairs in the outer regions 22 in each of the plurality of subframes.

Figure 7B:
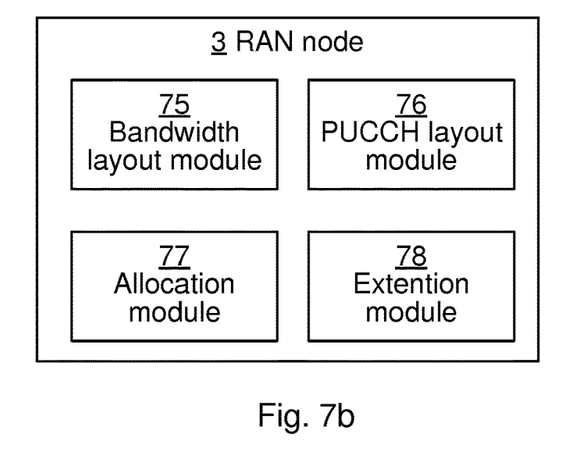
FIG. 7b is a schematic block diagram of another embodiment of a RAN node of the present disclosure.

FIG. 7b is a schematic block diagram functionally illustrating an embodiment of the RAN node 3 in FIG. 7a. As previously mentioned, the processor circuitry 71 may run software 81 for enabling the RAN node 3 to perform an embodiment of a method of the present disclosure, whereby functional modules may be formed in RAN node 3 e.g. in the processor circuitry 71 for performing the different steps of the method. These modules are schematically illustrated as blocks within the RAN node 3. Thus, the RAN node 3 comprises a bandwidth layout module 75 for, for each of the plurality of subframes, using S1 a bandwidth layout in frequency domain for an UL bandwidth 20 of the cell 4, which bandwidth is divided into a plurality of PRB pairs, in which bandwidth layout an inner region 21 for a PUSCH is positioned between outer regions 22a and 22b for a PUCCH. The RAN node 3 also comprises a PUCCH layout module 76 for, for each of the outer regions 22a and 22b, using S2 a PUCCH layout, which PUCCH layout comprises a plurality of sections 23a, 23b and 23c of which an innermost section 23a is for PUCCH Format 1 and a middle section 23b and an outermost section 23c are for PUCCH Formats 2 and 3, wherein the innermost section 23a comprises a plurality of parts 31a, 31b and 31c of which an innermost part 31a is for SRs 32. The RAN node 3 also comprises an allocation module 77 for, depending on the traffic load of the cell 4, dynamically allocating S3, contiguously inwards, PRB pairs 30 to SRs 32 in the outer regions 22 in the plurality of subframes 40 in accordance with the PUCCH layout. The RAN node 3 also comprises an extension module 78 for contiguously extending S4 the inner region 21 as allowed by the dynamic allocation of PRB pairs in the outer regions 22 in each of the plurality of subframes.

Alternatively, the modules mentioned in relation to FIG. 7b may be implemented as hardware modules, or a combination of software and hardware modules.

According to an aspect of the present disclosure, there is provided a RAN node 3 for an FDMA RAN 2. The RAN node comprises means 75 for, for each of a plurality of subframes, using S1 a bandwidth layout in frequency domain for an UL bandwidth 20 of a cell 4 provided by the RAN node, which bandwidth is divided into a plurality of PRB pairs, in which bandwidth layout an inner region 21 for a PUSCH is positioned between outer regions 22a and 22b for a PUCCH. The RAN node 3 also comprises means 76 for, for each of the outer regions 22a and 22b, using S2 a PUCCH layout, which PUCCH layout comprises a plurality of sections 23a, 23b and 23c of which an innermost section 23a is for PUCCH Format 1 and a middle section 23b and an outermost section 23c are for PUCCH Formats 2 and 3, wherein the innermost section 23a comprises a plurality of parts 31a, 31b and 31c of which an innermost part 31a is for SRs 32. The RAN node 3 also comprises means 77 for, depending on the traffic load of the cell 4, dynamically allocating S3, contiguously inwards, PRB pairs 30 to SRs 32 in the outer regions 22 in the plurality of subframes 40 in accordance with the PUCCH layout. The RAN node 3 also comprises means 78 for contiguously extending S4 the inner region 21 as allowed by the dynamic allocation of PRB pairs in the outer regions 22 in each of the plurality of subframes.

Figure 8:
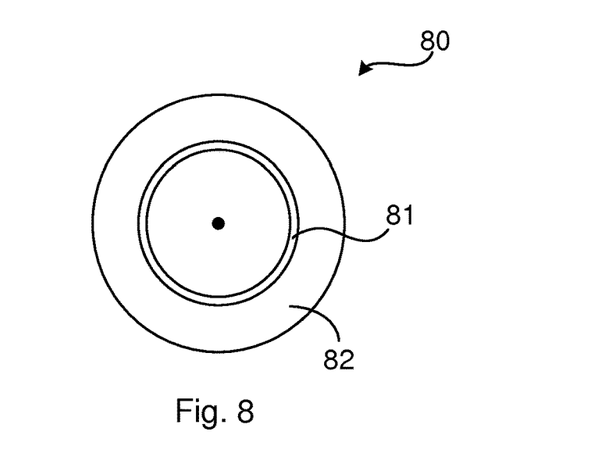
FIG. 8 is a schematic illustration of an embodiment of a computer program product in accordance with the present disclosure.

FIG. 8 illustrates a computer program product 80. The computer program product 80 comprises a computer readable (e.g. non-volatile and/or non-transitory) medium 82 comprising a computer program 81 in the form of computer-executable components 81. The computer program/computer-executable components 81 may be configured to cause a device, e.g. a RAN node 3 as discussed herein, to perform an embodiment of the method of the present disclosure. The computer program/computer-executable components may be run on the processor circuitry 71 of the device 3 for causing the device to perform the method. The computer program product 80 may e.g. be comprised in a storage unit or memory 72 comprised in the device 3 and associated with the processor circuitry 71. Alternatively, the computer program product 80 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 80 comprising computer-executable components 81 for causing a RAN node 3 to perform an embodiment of the method of the present disclosure when the computer-executable components are run on processor circuitry 71 comprised in the RAN node.

According to another aspect of the present disclosure, there is provided a computer program 81 for dynamic allocation of radio UL PRB pairs 30 of a plurality of subframes 40 in a cell 4 of an FDMA RAN 2. The computer program comprises computer program code which is able to, when run on processor circuitry 71 of a RAN node 3, cause the RAN node to, for each of the plurality of subframes, use S1 a bandwidth layout in frequency domain for an UL bandwidth 20 of the cell 4, which bandwidth is divided into a plurality of PRB pairs, in which bandwidth layout an inner region 21 for a PUSCH is positioned between outer regions 22a and 22b for a PUCCH. The code is also able to cause the RAN node 3 to, for each of the outer regions 22a and 22b use S2 a PUCCH layout, which PUCCH layout comprises a plurality of sections 23a, 23b and 23c of which an innermost section 23a is for PUCCH Format 1 and a middle section 23b and an outermost section 23c are for PUCCH Formats 2 and 3, wherein the innermost section 23a comprises a plurality of parts 31a, 31b and 31c of which an innermost part 31a is for SRs 32. The code is also able to cause the RAN node 3 to, depending on the traffic load of the cell 4, dynamically allocate S3, contiguously inwards, PRB pairs 30 to SRs 32 in the outer regions 22 in the plurality of subframes 40 in accordance with the PUCCH layout. The code is also able to cause the RAN node 3 to contiguously extend S4 the inner region 21 as allowed by the dynamic allocation of PRB pairs in the outer regions 22 in each of the plurality of subframes.

According to another aspect of the present disclosure, there is provided a computer program product 80 comprising an embodiment of a computer program 81 of the present disclosure and a computer readable means 82 on which the computer program is stored.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for dynamic allocation of radio uplink (UL) Physical Resource Block (PRB) pairs of a plurality of subframes in a cell of a Frequency Division Multiple Access (FDMA) Radio Access Network (RAN), the method comprising:
   for each of the plurality of subframes, using a bandwidth layout in frequency domain for an UL bandwidth of the cell, which bandwidth is divided into a plurality of PRB pairs, in which bandwidth layout an inner region for a Physical Uplink Shared Channel (PUSCH) is positioned between outer regions for a Physical Uplink Control Channel (PUCCH);
   for each of the outer regions, using a PUCCH layout, which PUCCH layout comprises a plurality of sections of which an innermost section is for PUCCH Format 1, a middle section is for PUCCH Format 2, and an outermost section is for PUCCH Format 3, wherein the innermost section for the PUCCH Format 1 comprises a plurality of parts of which an innermost part adjacent to the PUSCH is for Scheduling Requests (SR);
   depending on a traffic load of the cell, dynamically adjusting allocation of PRB pairs to SRs contiguously adjacent to the PUSCH by allocating an additional PRB pair to SRs, when a number of available SR allocated PRB pairs is below a predetermined first threshold, or by deallocating an existing SR PRB pair, when a number of available SR allocated PRB pairs is above a predetermined second threshold; and
   in response to adjusting allocation of the PRB pairs to SRs, extending or shrinking the inner region for the PUSCH.

2. The method of claim 1, wherein the adjusting allocation of PRB pairs to SRs comprises allocation in a time domain by allocating PRB pairs to SRs in each subframe of a subgroup of the plurality of subframes.

3. The method of claim 2, wherein the innermost section further comprises a middle part, adjacent to the innermost part, which is for Hybrid Automatic Repeat Request (HARQ) Acknowledgements(ACK), and wherein the method further comprises:
   dynamically allocating resources of a Physical Downlink Control Channel (PDCCH), such that corresponding HARQ ACKs in the middle part are allocated PRB pairs in the frequency domain as outwardly as possible in subframes not part of the subgroup of the plurality of subframes.

4. The method of claim 2, further comprising:
   depending on the traffic load of the cell, dynamically allocating downlink (DL) transmissions in the time domain such that corresponding acknowledgement recourses of at least one of Format 1 and Format 3 are allocated PRB pairs primarily in subframes part of the subgroup of the plurality of subframes.

5. The method of claim 1, wherein allocating the additional PRB pair is triggered by an expiry of a first timer, and wherein deallocating the existing PRB pair is triggered by an expiry of a second timer.

6. A method of using a bandwidth layout in frequency domain for an uplink (UL) bandwidth of a cell in a Frequency Division Multiple Access (FDMA) Radio Access Network (RAN), which bandwidth is divided into a plurality of Physical Resource Block (PRB) pairs, in which bandwidth layout an inner region for a Physical Uplink Shared Channel (PUSCH) is positioned between outer regions for a Physical Uplink Control Channel (PUCCH), the method comprising;
   using a PUCCH layout for each of the outer regions, which PUCCH layout comprises a plurality of sections of which an innermost section is for PUCCH Format 1, a middle section is for PUCCH Format 2, and an outermost section is for PUCCH Format 3, wherein the innermost section for the PUCCH Format 1 comprises a plurality of parts, and using an innermost part of PUCCH Format 1 adjacent to the PUSCH for Scheduling Requests (SR);
   depending on a traffic load of the cell, dynamically adjusting allocation of PRB pairs to SRs contiguously adjacent to the PUSCH by allocating an additional PRB pair to SRs, when a number of available SR allocated PRB pairs is below a predetermined first threshold, or by deallocating an existing SR PRB pair, when a number of available SR allocated PRB pairs is above a predetermined second threshold; and
   in response to adjusting allocation of the PRB pairs to SRs, extending or shrinking the inner region for the PUSCH.

7. The method of claim 6, further comprising using the innermost section that comprises a middle part, adjacent to the innermost part, for Hybrid Automatic Repeat Request (HARQ) Acknowledgements (ACK).

8. The method of claim 7, further comprising using the innermost section that comprises an outermost part, adjacent to the middle part and to the middle section, for Channel Selection (CS).

9. The method of claim 6, further comprising extending the inner region, in at least one subframe, contiguously to comprise all PRB pairs of the bandwidth.

10. A Radio Access Network (RAN) node for a Frequency Division Multiple Access (FDMA) RAN, the RAN node comprising:

processor circuitry; and storage for storing instructions executable by said processor circuitry, wherein the instructions which, when executed by said processor circuitry, cause said RAN node to perform operations to:

for each of a plurality of subframes, use a bandwidth layout in frequency domain for an uplink (UL) bandwidth of a cell provided by the RAN node, which bandwidth is divided into a plurality of Physical Resource Block (PRB) pairs, in which bandwidth layout an inner region for a Physical Uplink Shared Channel (PUSCH) is positioned between outer regions for a Physical Uplink Control Channel (PUCCH);

for each of the outer regions, use a PUCCH layout, which PUCCH layout comprises a plurality of sections of which an innermost section is for PUCCH Format 1, a middle section is for PUCCH Format 2, and an outermost section is for PUCCH Format 3, wherein the innermost section for the PUCCH Format 1 comprises a plurality of parts of which an innermost part adjacent to the PUSCH is for Scheduling Requests (SR);

depending on a traffic load of the cell, dynamically adjust allocation of PRB pairs to SRs contiguously adjacent to the PUSCH by allocating an additional PRB pair to SRs, when a number of available SR allocated PRB pairs is below a predetermined first threshold, or by deallocating an existing SR PRB pair, when a number of available SR allocated PRB pairs is above a predetermined second threshold; and in response to adjusting allocation of the PRB pairs to SRs, extend or shrink the inner region for the PUSCH.

11. The RAN node of claim 10, wherein the instructions, when executed by said processor circuitry, cause said RAN node to allocate PRB pairs to SRs in a time domain by allocating PRB pairs to SRs in each subframe of a subgroup of the plurality of subframes.

12. The RAN node of claim 11, wherein the innermost section further comprises a middle part, adjacent to the innermost part, which is for Hybrid Automatic Repeat Request (HARQ) Acknowledgements(ACK), and wherein the instructions, when executed by said processor circuitry, further cause said RAN node to perform operations to:

dynamically allocate resources of a Physical Downlink Control Channel (PDCCH), such that corresponding HARQ ACKs in the middle part are allocated PRB pairs in the frequency domain as outwardly as possible in subframes not part of the subgroup of the plurality of subframes.

13. The RAN node of claim 11, wherein the instructions, when executed by said processor circuitry, further cause said RAN node to perform operations to:

depending on the traffic load of the cell, dynamically allocate downlink (DL) transmissions in the time domain such that corresponding acknowledgement recourses of at least one of Format 1 and Format 3 are allocated PRB pairs primarily in subframes part of the subgroup of the plurality of subframes.

14. The RAN node of claim 10, wherein the instructions, when executed by said processor circuitry, further cause said RAN node to perform operations to allocate the additional PRB pair when triggered by an expiry of a first timer, and perform the operations to deallocate the existing PRB pair when triggered by an expiry of a second timer.

15. A non-transitory computer readable storage medium having stored thereon a computer program comprising computer program code which, when executed on a processor circuitry of a Radio Access Network (RAN) node, cause for dynamic adjustment of allocation of radio uplink (UL) Physical Resource Block (PRB) pairs of a plurality of subframes in a cell of a Frequency Division Multiple Access (FDMA) RAN by having the RAN node perform operations comprising:

for each of the plurality of subframes, using a bandwidth layout in frequency domain for an UL bandwidth of the cell, which bandwidth is divided into a plurality of PRB pairs, in which bandwidth layout an inner region for a Physical Uplink Shared Channel (PUSCH) is positioned between outer regions for a Physical Uplink Control Channel (PUCCH);

for each of the outer regions, using a PUCCH layout, which PUCCH layout comprises a plurality of sections of which an innermost section is for PUCCH Format 1, a middle section is for PUCCH Format 2, and an outermost section is for PUCCH Format 3, wherein the innermost section for the PUCCH Format 1 comprises a plurality of parts of which an innermost part adjacent to the PUSCH is for Scheduling Requests (SR);

depending on a traffic load of the cell, dynamically adjusting allocation of PRB pairs to SRs contiguously adjacent to the PUSCH by allocating an additional PRB pair to SRs, when a number of available SR allocated PRB pairs is below a predetermined first threshold, or by deallocating an existing SR PRB pair, when a number of available SR allocated PRB pairs is above a predetermined second threshold; and in response to adjusting allocation of the PRB pairs to SRs, extending or shrinking the inner region for the PUSCH.

* * * * *